(12) United States Patent
Ewert

(10) Patent No.: US 10,699,132 B2
(45) Date of Patent: Jun. 30, 2020

(54) INFORMATION SYSTEM FOR A MOTOR VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

(*) Notice: Subject to any disclaimer, the term of this patent is extended or adjusted under 35 U.S.C. 154(b) by 86 days.

(21) Appl. No.: 15/450,681

(22) Filed: Mar. 6, 2017

(65) Prior Publication Data

US 2017/0262711 A1 Sep. 14, 2017

(30) Foreign Application Priority Data

Mar. 8, 2016 (DE) .................. 10 2016 203 725

(51) Int. Cl.
| | |
|---|---|
| *G06K 9/00* | (2006.01) |
| *B60K 35/00* | (2006.01) |
| *B60R 1/00* | (2006.01) |
| *H04N 7/18* | (2006.01) |
| *B60Q 9/00* | (2006.01) |

(52) U.S. Cl.
CPC .......... *G06K 9/00791* (2013.01); *B60K 35/00* (2013.01); *B60Q 9/00* (2013.01); *B60R 1/00* (2013.01); *H04N 7/181* (2013.01); *B60K 2370/178* (2019.05); *B60K 2370/179* (2019.05); *B60K 2370/193* (2019.05); *B60K 2370/21* (2019.05); *B60K 2370/5915* (2019.05); *B60R 2300/105* (2013.01); *B60R 2300/106* (2013.01); *B60R 2300/301* (2013.01); *B60R 2300/302* (2013.01)

(58) Field of Classification Search
CPC ........ B60R 2300/302; B60W 2250/408; G01S 17/936; H04N 7/181
See application file for complete search history.

(56) References Cited

U.S. PATENT DOCUMENTS

| | | | | |
|---|---|---|---|---|
| 6,859,731 | B2* | 2/2005 | Takafuji | B60R 21/0132 180/167 |
| 9,628,170 | B1* | 4/2017 | Rosenband | H04B 7/24 |
| 10,033,456 | B2* | 7/2018 | Rosenband | H04B 7/26 |
| 2016/0277601 | A1* | 9/2016 | Seymour | H04N 7/181 |
| 2017/0080897 | A1* | 3/2017 | Nordbruch | B60R 25/102 |
| 2017/0214458 | A1* | 7/2017 | Rosenband | H04B 7/24 |
| 2018/0123412 | A1* | 5/2018 | Karplus | H02K 11/215 |

* cited by examiner

*Primary Examiner* — Paulos M Natnael
(74) *Attorney, Agent, or Firm* — Norton Rose Fulbright US LLP; Gerard Messina

(57) ABSTRACT

In a method, an area surrounding a first motor vehicle is scanned optically on the part of the first motor vehicle; a message is determined on the basis of the scanned information; the message is transmitted from the first motor vehicle to a second motor vehicle, a distance between the first and the second motor vehicle not exceeding a predetermined maximum value; a graphic representation of the area surrounding the first motor vehicle is determined on the basis of the message; and the representation is output on board the second motor vehicle.

11 Claims, 4 Drawing Sheets

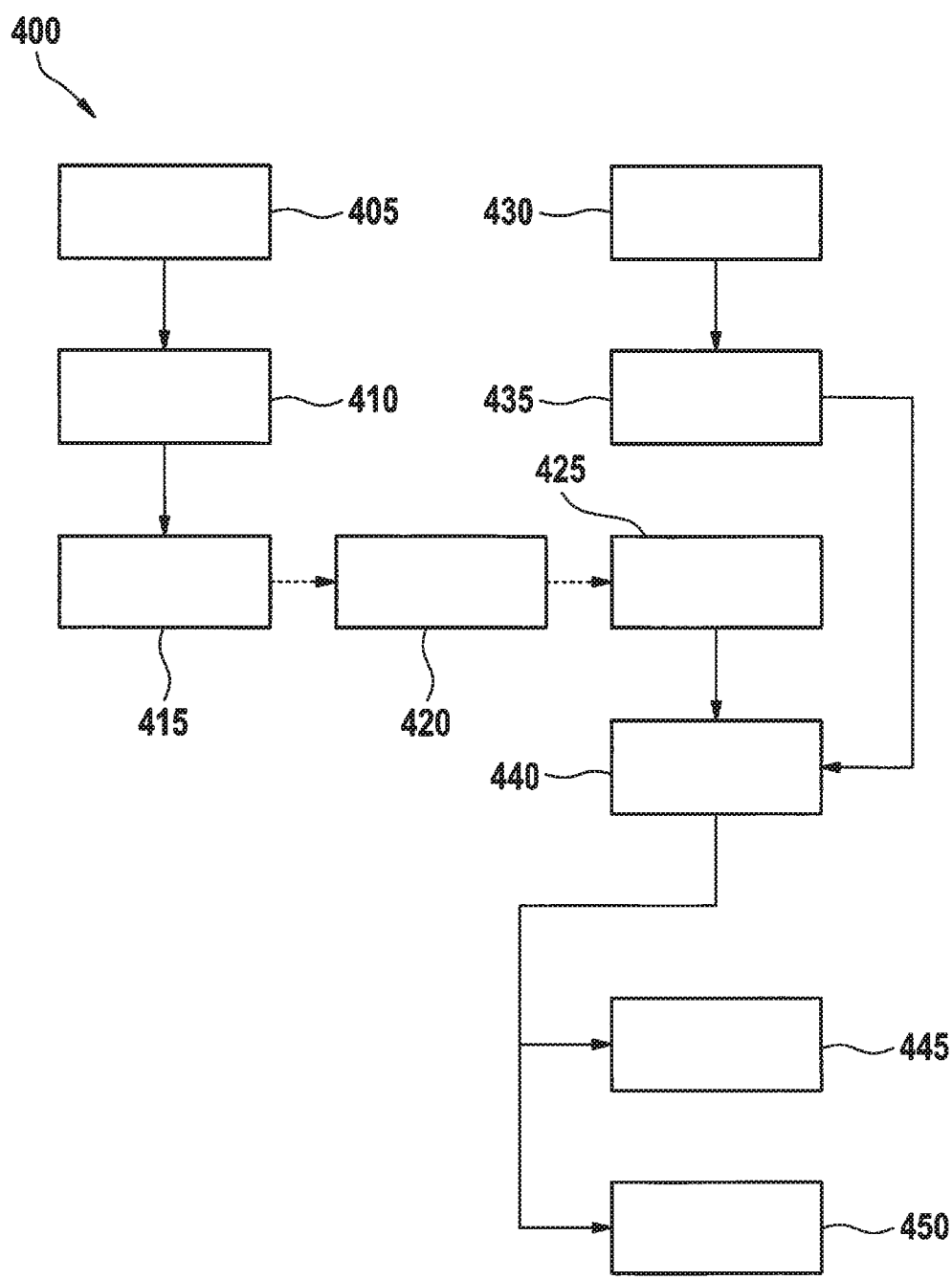

INFORMATION SYSTEM FOR A MOTOR VEHICLE

FIELD OF THE INVENTION

The present invention relates to an information system for a motor vehicle. In particular, the invention relates to the acquisition of traffic-relevant information on board a motor vehicle.

BACKGROUND INFORMATION

A motor vehicle may be equipped with a car-to-car (C2C) interface or a car-to-infrastructure (C2I) interface in order to obtain information, which may be of importance for driving the motor vehicle, from an external source. Such information usually includes a current speed limit, a statistically ascertained traffic situation or a localized warning of a danger spot.

However, traffic-relevant information which is transmitted from one motor vehicle to another often cannot be utilized advantageously on the destination side, since directly transmitted information is not standardized in its format, and standardized information frequently requires interposed processing that may adversely affect the currentness of the information.

The object of the present invention is to indicate an improved technique for providing information on board a motor vehicle.

SUMMARY

In a method, an area surrounding a first motor vehicle is scanned optically on the part of the first motor vehicle; a message is determined on the basis of the scanned information; the message is transmitted from the first motor vehicle to a second motor vehicle, in doing which, a distance between the first and the second motor vehicle not exceeding a predetermined maximum value; a graphic representation of the area surrounding the first motor vehicle is determined on the basis of the message; and the representation is output on board the second motor vehicle.

Put another way, camera images may be taken in the area of the first motor vehicle and transmitted to the second motor vehicle, where they are represented graphically. A driver of the second motor vehicle may thereby obtain current information able to be interpreted by him himself, the information being able to allow him to better control the second motor vehicle. For example, information difficult to detect automatically, such as local weather in the area of the first motor vehicle, a surface condition, a danger spot, following traffic or oncoming traffic in the area of the first motor vehicle, is able to be determined easily by the driver of the second motor vehicle. The driver is able to drive the second motor vehicle more safely, because he has an improved base of information. In one specific embodiment, the first motor vehicle is on the same road in front of the second motor vehicle, so that the driver of the second vehicle is able to better recognize on the display, the traffic situation he must expect before long.

The limitation to a predetermined maximum distance between the two motor vehicles is able to ensure that only such information is displayed on board the second motor vehicle which relates immediately or within a predetermined time horizon to the driving of the second motor vehicle. An information overload may thereby be avoided for the driver of the second motor vehicle.

By the transmission of optical information from the first to the second motor vehicle, intermediate processing by a central entity which, in particular, is able to correlate items of information from many motor vehicles with each other, may be dispensed with, so that the information available on the part of the second motor vehicle may have a high degree of relevance.

In one especially preferred specific embodiment, the second motor vehicle is controlled on the basis of the message. In particular, the second motor vehicle may have a driver assist which controls at least one aspect of the operation of the second motor vehicle. For example, the driver assist may include a lane-keeping assist or an automatic vehicle-to-vehicle distance keeper. In addition or as an alternative to the use of locally scanned information, for example, a processing system on board the second motor vehicle may use the information transmitted by the first motor vehicle, to implement a longitudinal control of the motor vehicle. For instance, if a preceding motor vehicle outside of a visual range of the driver of the second motor vehicle is braking, this information may be evaluated automatically on board the second motor vehicle, and the speed of the second motor vehicle may be reduced automatically.

In a further specific embodiment, the second motor vehicle is equipped to be controlled autonomously. In this case, all aspects of the vehicle control of the second motor vehicle are implemented with the aid of a processing device. A driver of the second motor vehicle does not have to intervene in the control, and is usually not even available, or is available only with a predetermined delay, as a fall-back position in case of an occurring error. The autonomous control of the second motor vehicle is able to benefit from the completely or largely unprocessed visual information in the area of the first motor vehicle. For example, locally determined information and information received from the first motor vehicle may be merged together. Questionable information or false information may thereby be identified more easily. Agreeing information may be checked mutually for plausibility.

In one specific embodiment, the maximum value of the distance between the first and the second motor vehicle is selected as a function of a traveling speed of the second motor vehicle. At a higher traveling speed, a reaction time of a driver or an automatic control and also a braking distance or stopping distance of the second motor vehicle may be lengthened. By increasing the maximum value, information may be acquired from a larger perimeter around the second motor vehicle, so that after this information is received, sufficient time may still remain to intervene in the control of the second motor vehicle, if this is necessary.

In one specific embodiment, the message is transmitted wirelessly directly from the first to the second motor vehicle. For instance, this may be accomplished using techniques of near field communication (NFC), WLAN, cellular radio system or a wireless Internet access. The direct communication of information from the first to the second motor vehicle may help to minimize transmission times. The information available on board the second motor vehicle may thereby be kept better up-to-date.

The last-named technique is also known as C2C communication. In another advantageous specific embodiment, a C2I communication may also be selected. In that case, the message is transmitted wirelessly to a first stationary infrastructure in the area of the first motor vehicle, from there to a second infrastructure in the area of the second motor vehicle, and from there wirelessly to the second motor vehicle. The two infrastructures may be connected to each other wirelessly, in wire-bound fashion, or with the aid of an arbitrary, also heterogeneous network. It is thereby possible to dispense with the transmission of information between two moving motor vehicles that is often difficult from the standpoint of signal technology. In addition, the transmitted information may be further processed on the part of the infrastructure so that, for example, it may be made available to a third motor vehicle.

In still another specific embodiment, the message is transmitted from the first motor vehicle to a third motor vehicle, and from there to the second motor vehicle. In addition, the third motor vehicle may behave like the first motor vehicle, by passing on locally scanned optical information to the second motor vehicle. In this manner, a transmission range of communication means between the first and the second motor vehicle may be enlarged. A message received by the third motor vehicle may also undergo intermediate processing by, for example, checking it for plausibility on the basis of information ascertained on the part of the third motor vehicle. In this manner, the quality of the information arriving at the second motor vehicle may be improved.

It is especially preferred that the message includes the position of the first motor vehicle and/or a scanning time. By comparison with a position of the second motor vehicle and an instantaneous time, it may be determined on the part of the second motor vehicle whether, at the time of the scanning, the first motor vehicle was at a distance that is shorter than the predetermined maximum value. In another specific embodiment, the adherence to the maximum value may be ensured with the aid of means of the signal transmission in that, for example, a wireless signal receivable only within a predetermined radius is emitted by the first motor vehicle. In addition, the scanning time may indicate how up-to-date the received information is.

In a further specific embodiment, the optically scanned information is interpreted by machine on the part of the first motor vehicle, the message including an indication of a result of the interpretation. For example, an image recognition process may be carried out on board the first motor vehicle in order, for instance, to determine the direction and traveling speed of a preceding further motor vehicle, to identify a local danger spot or to automatically recognize a traffic sign in the area of the first motor vehicle. The result(s) of the interpretation or image processing may enable the second motor vehicle to compare its own determinations with those of the first motor vehicle or to dispense with its own image processing. The interpreted information may be output together with the display on board the second motor vehicle. The results of an interpretation may also underlie the control of the second motor vehicle.

It is especially preferred that an area surrounding the second motor vehicle is scanned on the part of the second motor vehicle, and the scanned information is merged with information of the message.

A computer program product includes program code means for carrying out the method described above when the computer program product runs on a processing device or is stored on a machine-readable storage medium.

A first control apparatus for a first motor vehicle includes a scanning device for the optical scanning of an area surrounding the first motor vehicle; a processing device for determining a message on the basis of the scanned information; and a transmitting device for the wireless transmission of the message. A second control apparatus for a second motor vehicle includes a receiving device for receiving a message from a first motor vehicle, a distance between the first and the second motor vehicle not exceeding a predetermined maximum value; a processing device for determining a graphic representation of the area surrounding the first motor vehicle on the basis of the message; and an output device for the output of the graphic representation.

The two control apparatuses are preferably equipped to carry out the method described above. To that end, they may form a system which, in one specific embodiment, additionally includes a third motor vehicle or an infrastructure, as described in greater detail above.

BRIEF DESCRIPTION OF THE DRAWINGS

FIG. 4. shows a flow chart of a method for controlling a motor vehicle.

DETAILED DESCRIPTION

Figure 1:
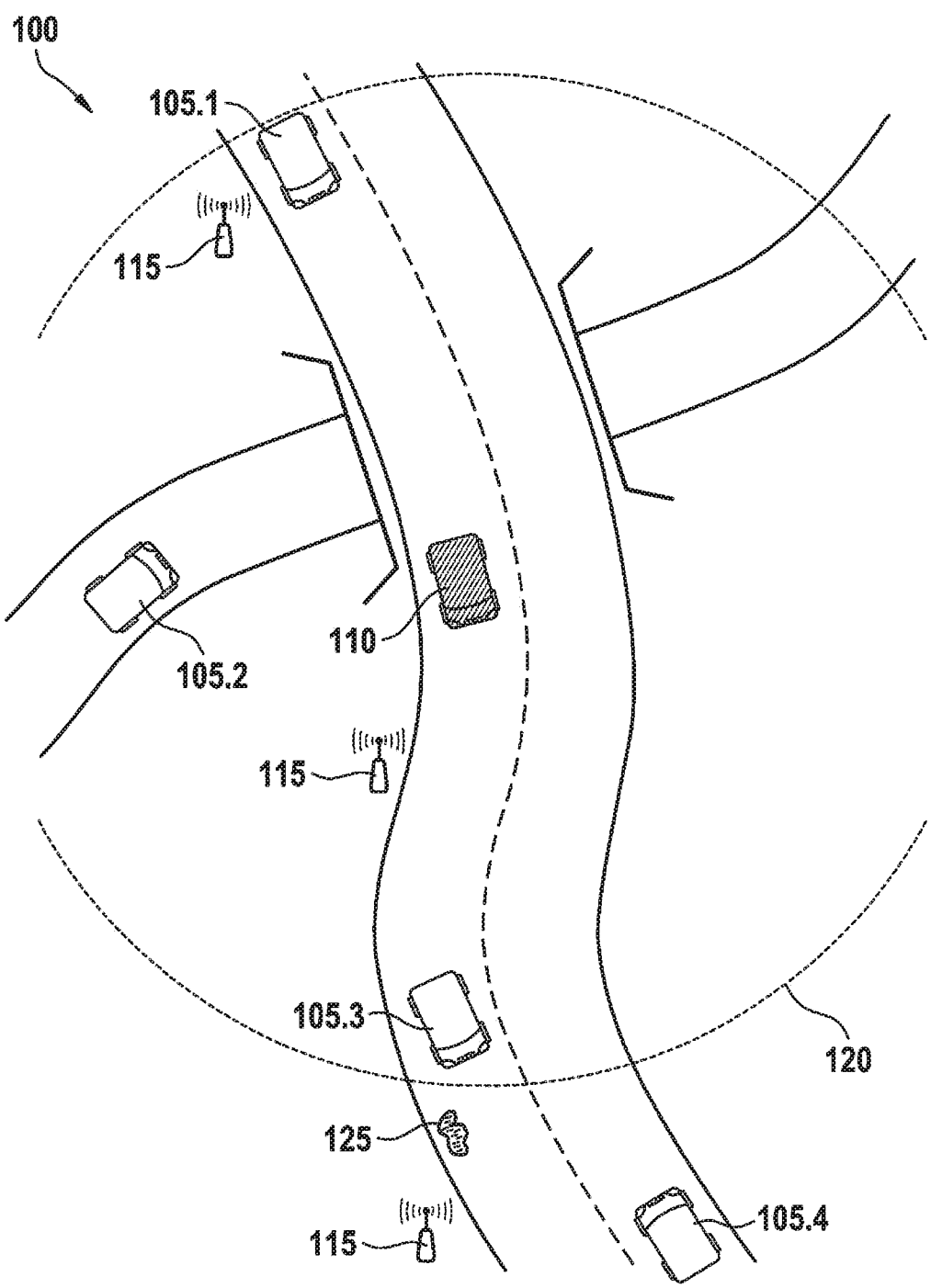
FIG. 1. shows a system with several motor vehicles.

FIG. 1 shows a system 100 that includes a first motor vehicle 105 and a second motor vehicle 110. Several first vehicles 105 in exemplary situations and distances relative to second motor vehicle 110 are shown, which are numbered consecutively with suffixes 1 through 4.

A first motor vehicle 105.1 is following second motor vehicle 110. A first motor vehicle 105.2 is using a different road than second motor vehicle 110. A first motor vehicle 105.3 is driving in front of second motor vehicle 110, and a first motor vehicle 105.4 is coming towards second motor vehicle 110.

In order to improve the control of second motor vehicle 110, it is proposed that a first motor vehicle 105 optically scan information from its surrounding area, and transmit it directly or with the use of a stationary infrastructure 115 to second motor vehicle 110. There, the information is received, evaluated and represented graphically. A driver of second motor vehicle 110 is able to gather a multitude of different information from the graphic representation and drive motor vehicle 110 in improved fashion based on this information. In a further specific embodiment, second motor vehicle 110 is equipped to drive partially or completely autonomously, that is, one or more driving functions are taken over by an automatic system. The automatic system is able to evaluate information transmitted by first motor vehicle 105, in order to adapt or improve the control of second motor vehicle 110.

It is preferred that only that information which was scanned by first motor vehicle 105 at a given point in time within a predetermined maximum distance 120 be taken into account on the part of motor vehicle 110. In one specific embodiment, transmission technology is used whose effective range defines maximum distance 120. In another specific embodiment, it is checked on the part of second motor vehicle 110, whether arriving information is specific to a position that is located within a circle having maximum distance 120 as radius around second motor vehicle 110. To that end, it is preferred that in addition to optically scanned information from the area of first motor vehicle 105, a position of first motor vehicle 105 at the instant of scanning is also determined on the part of first motor vehicle 105, and both items of information are combined in one message which is transmitted by first motor vehicle 105 to second motor vehicle 110.

In addition to the optical information, other information may also be transmitted within the context of the message from first motor vehicle 105 to second motor vehicle 110. In particular, this information may include a scanning instant, a transmission instant, a direction of movement and velocity of movement of first motor vehicle 105, or information that was determined by other sensors on board first motor vehicle 105, for example, an outside temperature, information from a rain sensor or a specific coefficient of friction of the road used.

Further transmitted information may include:
camera image data (e.g., raw data, compressed image data, night-vision data)
position data (e.g., GPS, GLONASS, BeiDou, Galileo)
object data (e.g., obstacles, pedestrians, further vehicles)
warning messages (e.g., traffic jam, obstacles)
vehicle ID
time stamp of the message
parameters for communication quality
etc.

In addition, information available on board first motor vehicle 105 may be interpreted, for instance, the optically scanned information may undergo image processing. A result of the image processing or new information resulting from the image processing may then be added, preferably in abstract form, to the message. For instance, such information may include the existence of an obstacle 125, oncoming or following traffic, a curve, a crest or dip or other traffic-relevant information which, in particular, is derived from the optical information. In a further example, traffic information such as a traffic jam or end of a traffic jam, a traffic-light phase or an ambulance in the area of first motor vehicle 105 may be recognized and attached as information to the message to second motor vehicle 110.

The information added to the message may be evaluated automatically on the part of second motor vehicle 110. In particular, motor vehicle 110 may be controlled better as a function of the information received within the context of the message. In addition, a piece of the received information may be displayed graphically on board second motor vehicle 110, e.g., in the form of as descriptive a warning symbol as possible, a handling instruction or as general advice to increase the attentiveness of the driver of second motor vehicle 110.

Figure 2:
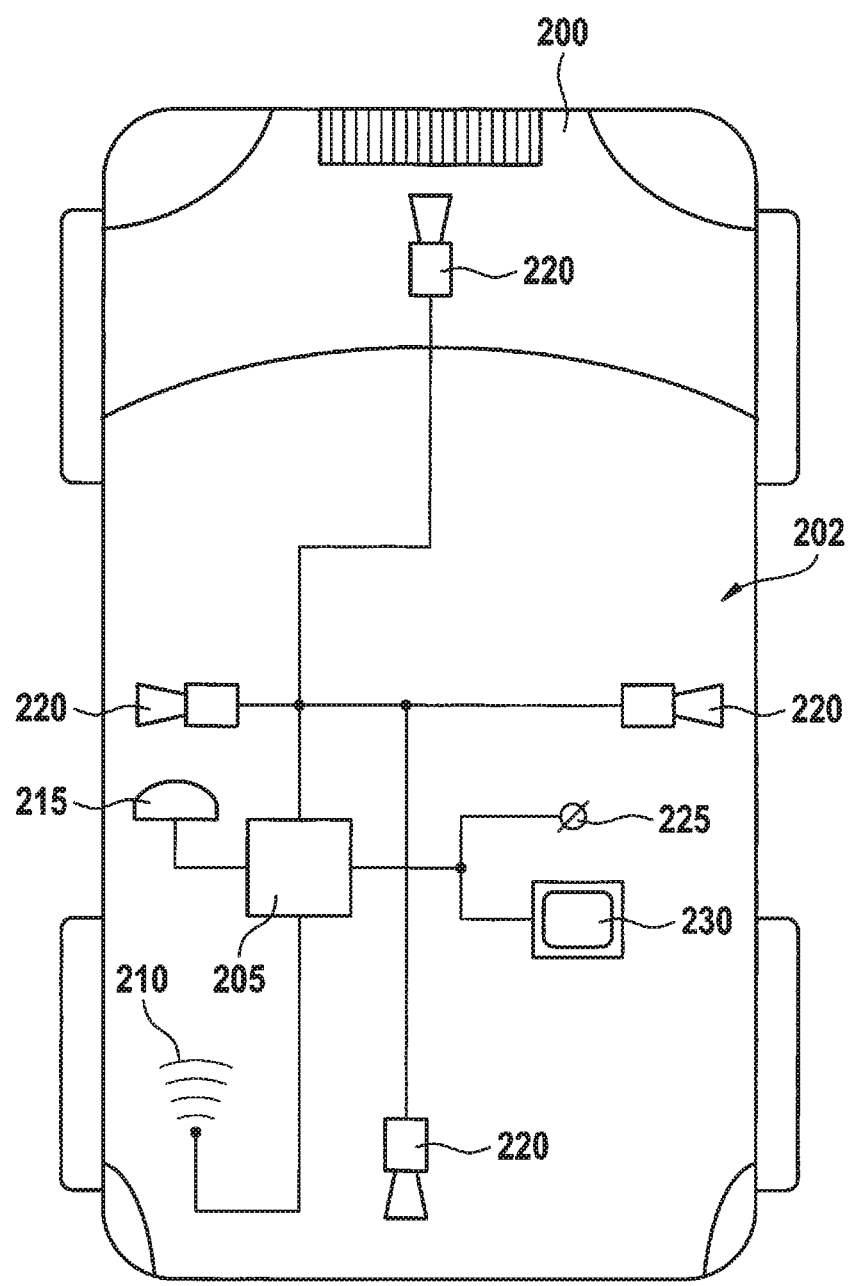
FIG. 2. shows one motor vehicle.

FIG. 2 shows a motor vehicle 200, which may be used as first motor vehicle 105 or second motor vehicle 110 within the framework of system 100 from FIG. 1. Motor vehicle 105 includes a control apparatus 202 for controlling motor vehicle 105. Control apparatus 202 includes a processing device 205, which is connected to a wireless communication device 210. If motor vehicle 200 is used as first motor vehicle 105 in system 100 of FIG. 1, then communication device 210 preferably includes at least one transmitting device; in second motor vehicle 110, communication device 210 preferably includes at least one receiving device. In both cases, a combined transmitting and receiving unit is preferred.

Preferably, a positioning device 215 is also provided, which in particular, may take the form of a receiver of a satellite navigation system such as GPS, Galileo, GLONASS or BeiDou. At least if motor vehicle 200 is intended to be used as first motor vehicle 105 in system 100 from FIG. 1, one or more cameras 220 are provided, which preferably are equipped to scan moving images (video) from an area surrounding motor vehicle 200. In this context, the range of visible light and, alternatively or additionally, a portion of the infrared spectrum may be scanned, in order to provide a night-vision capability of camera 220.

One camera 220 may be directed in the direction of travel of motor vehicle 200, another or further camera counter to the direction of travel. Additionally or alternatively, one or more laterally aligned cameras 220 may be provided. Cameras 220 are likewise connected to processing device 205.

Optionally, an interface 225 is provided, via which in first motor vehicle 105, additional information may be obtained from another system or subsystem on board first motor vehicle 105. In particular, such information may pertain to a driving state of the first motor vehicle, e.g., a direction and velocity of movement.

When motor vehicle 200 shown is used as second motor vehicle 110, interface 225 may likewise lead to a system or subsystem on board second motor vehicle 100, it being preferred, however, that this system be furnished to control second motor vehicle 110 in at least one aspect. Also on board second motor vehicle 110 is an output device 230, which is furnished to display a graphic representation.

In one development of represented motor vehicle 200 as first motor vehicle 105, processing device 205 is equipped, on the basis of information scanned with the aid of cameras 220, to generate a message which, optionally, may be augmented with further data. This further data is usually not of a graphical nature, and may include information about a driving state of first motor vehicle 105 or a result of image processing of the images supplied by cameras 220. The message may then be transmitted via communication device 210.

In one development of represented motor vehicle 200 as second motor vehicle 110, the message described above may be received by communication device 210 and analyzed. To that end, graphic information may be extracted from the message and displayed with the aid of graphic output device 230 on board second motor vehicle 110, particularly to a driver of second motor vehicle 110. Additional, usually non-graphic information found in the received message may be presented graphically or in some other way on board second motor vehicle 110. In one preferred specific embodiment, the graphic information and/or the additional information is made available with the aid of interface 225 to a further system on board second motor vehicle 110, that in particular, relates to the control of second motor vehicle 110.

Motor vehicle 200 shown may act both as first motor vehicle 105 and as second motor vehicle 110. In one especially preferred specific embodiment, these properties may be combined with each other so as, according to the type of second motor vehicle 110, to receive information from a first motor vehicle 105, possibly to process it or augment it with its own information, and according to the type of a first motor vehicle 105, to transmit it again. In this way, information may be passed on from motor vehicle to motor vehicle, in doing which, each time the information being able to be checked, augmented or updated. The quality or the degree of detail of the information may thereby constantly be improved.

Figure 3:
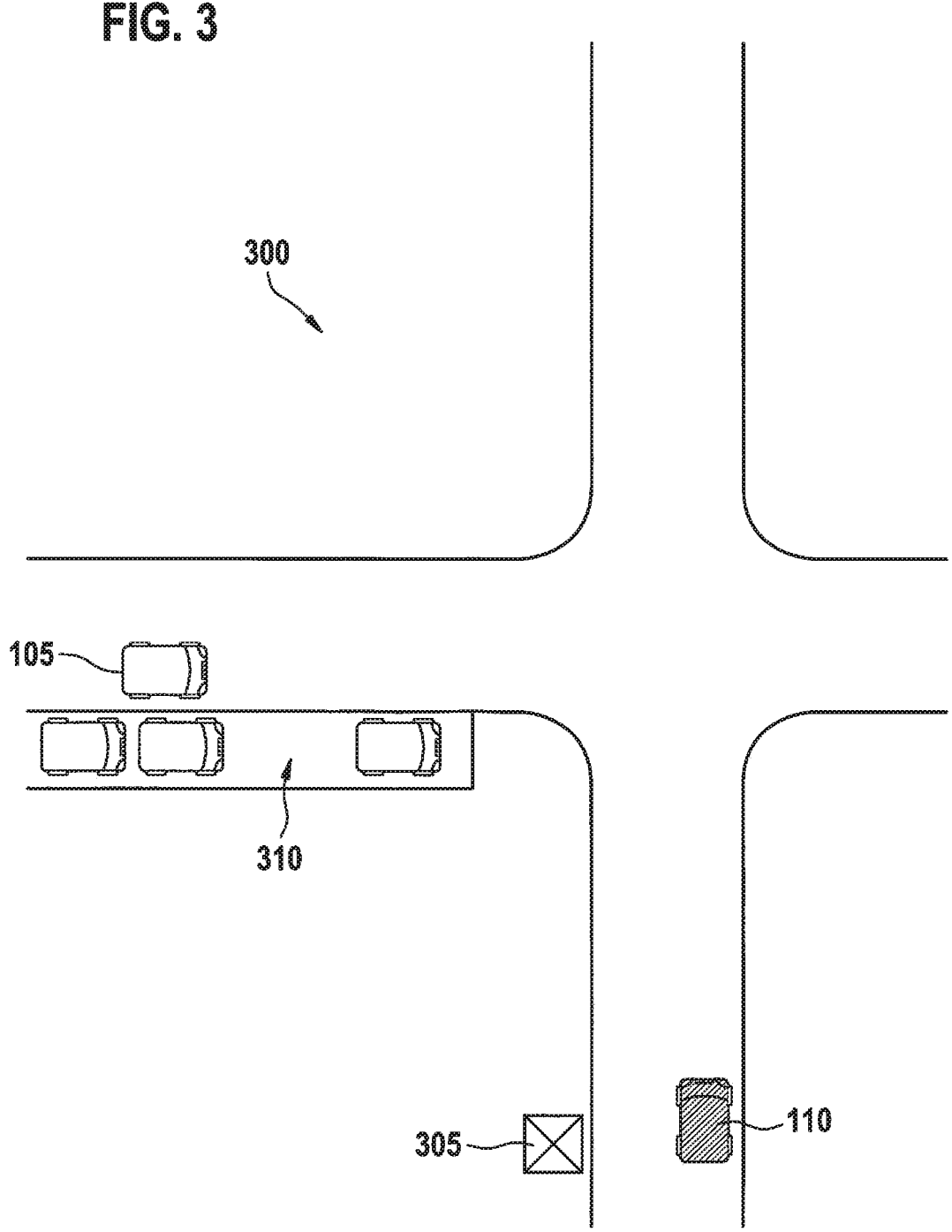
FIG. 3. shows a traffic situation with two motor vehicles.

FIG. 3 shows an exemplary traffic situation 300 with a first motor vehicle 105 and a second motor vehicle 110 of system 100 from FIG. 1. In exemplary manner, the use of system 100 for route planning or a search for a parking space shall be explained here in greater detail.

Second motor vehicle 110 is located in the vicinity of a destination 305, and the intention is to search for a parking space 310 in which second motor vehicle 110 may be parked as close to destination 305 as possible. To that end, second motor vehicle 110 may receive graphic information from the surroundings of first motor vehicle 105 in wireless fashion in the manner described above. A parking space 310, which is not visible from the position of second motor vehicle 110, is located here in the visual range of first motor vehicle 105. On the basis of a position of first motor vehicle 105, second motor vehicle 110—automatically, autonomously or controlled by a driver—is able to turn left at the intersection shown in order to arrive at parking space 310.

Since second motor vehicle 110 only takes into account information from first motor vehicles 105 which are located no further away than predetermined maximum distance 120, it is possible to ensure that only parking spaces 310 are sought which are relatively close to second motor vehicle 110, and therefore close to destination 305 in the situation shown.

In a further specific embodiment, several first motor vehicles 105 are closer than maximum distance 120 to second motor vehicle 110. A selection as to from which of first motor vehicles 105 information should be received and represented graphically on board second motor vehicle 110 may be made automatically, for example, on the basis of the distance between motor vehicles 105, 110, or manually, especially by a driver of second motor vehicle 110.

FIG. 4 shows a flowchart of a method 400 for controlling a second motor vehicle 110 like that in the previous figures. Steps 405 through 415 shown in a left area are preferably carried out on board first motor vehicle 105, step 420 shown in the center area by a third motor vehicle 200 or an infrastructure 115, and steps 425 through 450 shown in the right area preferably by a second motor vehicle 110.

In a step 405, optical information from a surrounding area is scanned on the part of first motor vehicle 105. Preferably, additional information, particularly a position of first motor vehicle 105, is also determined. Optionally, in a step 410, the scanned video data is merged or augmented with further data. For example, video data from several cameras 220 may be combined to form a panoramic image. In addition, an automatic object recognition process may be carried out on the camera image. In this manner, for example, a traffic sign, another road user, an obstacle 125 or perhaps a person, e.g., a child, is able to be recognized in the area of a used roadway. The optical data may be compressed, in doing which, a lossless or a lossy compression method may be used. Based on the scanned optical information and, optionally, further information as well, preferably a message is determined which, in a following step 415, is transmitted with the aid of communication device 210.

In a step 420, the message is passed on optionally by infrastructure 115 or by a third motor vehicle 200.

In a step 425, the message is received by second motor vehicle 110. It is preferred that, in a step 430, optical information is likewise scanned on the part of second motor vehicle 110 from its own surrounding area, and further preferred, is correlated with a position of second motor vehicle 110 at the scanning time. This step corresponds essentially to step 405. Subsequently, the data collected may be merged, combined and compressed, as was explained more precisely above with regard to step 410. In an optional step 440, the received data and the locally determined data may then be combined with each other. In one specific embodiment, in so doing, a validation takes place, that is, contradictions are discovered in the various data. In a further specific embodiment, at this point, data which comes from different first motor vehicles 105 may also be selected automatically or by a driver of second motor vehicle 110, and may be evaluated on board second motor vehicle 110.

In a step 445, a graphic representation of the area surrounding first motor vehicle 105 is generated on the basis of the information determined in one of steps 425 or 440, and preferably is displayed with the aid of graphic output device 230 on board second motor vehicle 110. In one specific embodiment, the graphic representation takes place on a built-in display system; in another specific embodiment, for example, what is referred to as a head-up-display (HUD) may also be used for the output.

Parallel to that, in a step 450, second motor vehicle 110 may be controlled on the basis of the received information. To that end, the graphic information may be subjected to an automatic recognition and interpretation process. In one specific embodiment, in step 450, the acquired information is merely passed on by interface 225 to a further system that controls second motor vehicle 110. In another specific embodiment, a system on board second motor vehicle 110 may simply be influenced via interface 225, for example, a route selection or the exact destination selection of a navigation system may be altered; for this, see above with reference to FIG. 3.

What is claimed is:

1. A method, comprising:
optically scanning, on the part of each of a plurality of first motor vehicles, an area surrounding each respective first motor vehicle to produce respective optically scanned information;
determining respective messages on the basis of the respectively optically scanned information;
transmitting each of the messages by a respective one of the first motor vehicles, a respective distance between the first vehicles and the second motor vehicle not exceeding a predetermined maximum value;
receiving the messages at a second vehicle that is different than each of the first motor vehicles;
selecting, by the second motor vehicle, one of the received messages on the basis of the respective distances;
determining a graphic representation of the area surrounding the first motor vehicle that transmitted the selected message on the basis of the optically scanned information of the selected message; and
outputting the representation on board the second motor vehicle.

2. The method as recited in claim 1, further comprising controlling the second motor vehicle on the basis of the selected message.

3. The method as recited in claim 1, further comprising selecting the maximum value as a function of a traveling speed of the second motor vehicle.

4. The method as recited in claim 1, wherein the messages are transmitted wirelessly directly from the first motor vehicles to the second motor vehicle.

5. The method as recited in claim 1, wherein for at least one first vehicle the transmitting includes:
transmitting the message wirelessly to a first stationary infrastructure in an area of the first motor vehicle,
transmitting the message wirelessly from the first stationary infrastructure to a second infrastructure in an area of the second motor vehicle, and
transmitting the message wirelessly from the second stationary infrastructure to the second motor vehicle.

6. The method as recited in claim 1, further comprising:
transmitting the selected message from the first motor vehicle to a third motor vehicle, and
transmitting the selected message from the third motor vehicle to the second motor vehicle.

7. The method as recited in one claim 1, wherein each of the messages includes at least one of a position of the first motor vehicle and a scanning time.

8. The method as recited in claim 1, further comprising:
interpreting the optically scanned information by machine on the part of the first motor vehicle, wherein the message includes an indication of a result of the interpreting.

9. The method as recited in claim 1, further comprising:
scanning an area surrounding the second motor vehicle on the part of the second motor vehicle to produce second scanned information; and
merging the second scanned information with information of the selected message.

10. A non-transitory computer program product having a program code for carrying out, when the computer program product one of runs on a processing device and is stored on a machine-readable storage medium, a method, comprising:
optically scanning, on the part of each of a plurality of first motor vehicles, an area surrounding each respective first motor vehicle to produce respective optically scanned information;
determining respective messages on the basis of the respectively optically scanned information;
transmitting each of the messages by a respective one of-the first motor vehicles, a respective distance between the first vehicles and the second motor vehicle not exceeding a predetermined maximum value;
receiving the messages at a second vehicle that is different than each of the first motor vehicles;
selecting, by the second motor vehicle, one of the received messages on the basis of the respective distances;
determining a graphic representation of the area surrounding the first motor vehicle that transmitted the selected message on the basis of the optically scanned information of the selected message; and
outputting the representation on board the second motor vehicle.

11. A control apparatus for a second motor vehicle, comprising:
a receiving device for receiving a plurality of messages, each message transmitted by a respective one of a respective plurality of first motor vehicles, a respective distance between the first vehicles and the second motor vehicle not exceeding a predetermined maximum value, the second motor vehicle being different than each of the first motor vehicles;
a processing device for:
selecting, by the second motor vehicle, one of the received messages on the basis of the respective distances, and
determining a graphic representation of the area surrounding the first motor vehicle that transmitted the selected message on the basis of an optically scanned information of the selected message; and
an output device for outputting the graphic representation.

* * * * *